Dec. 21, 1965    H. BLAZEK    3,224,281
BASE MOTION COMPENSATOR FOR RATE INTEGRAL GYRO
Filed July 12, 1961    3 Sheets-Sheet 1

INVENTOR
Henry Blazek
BY Borst & Borst
ATTORNEY

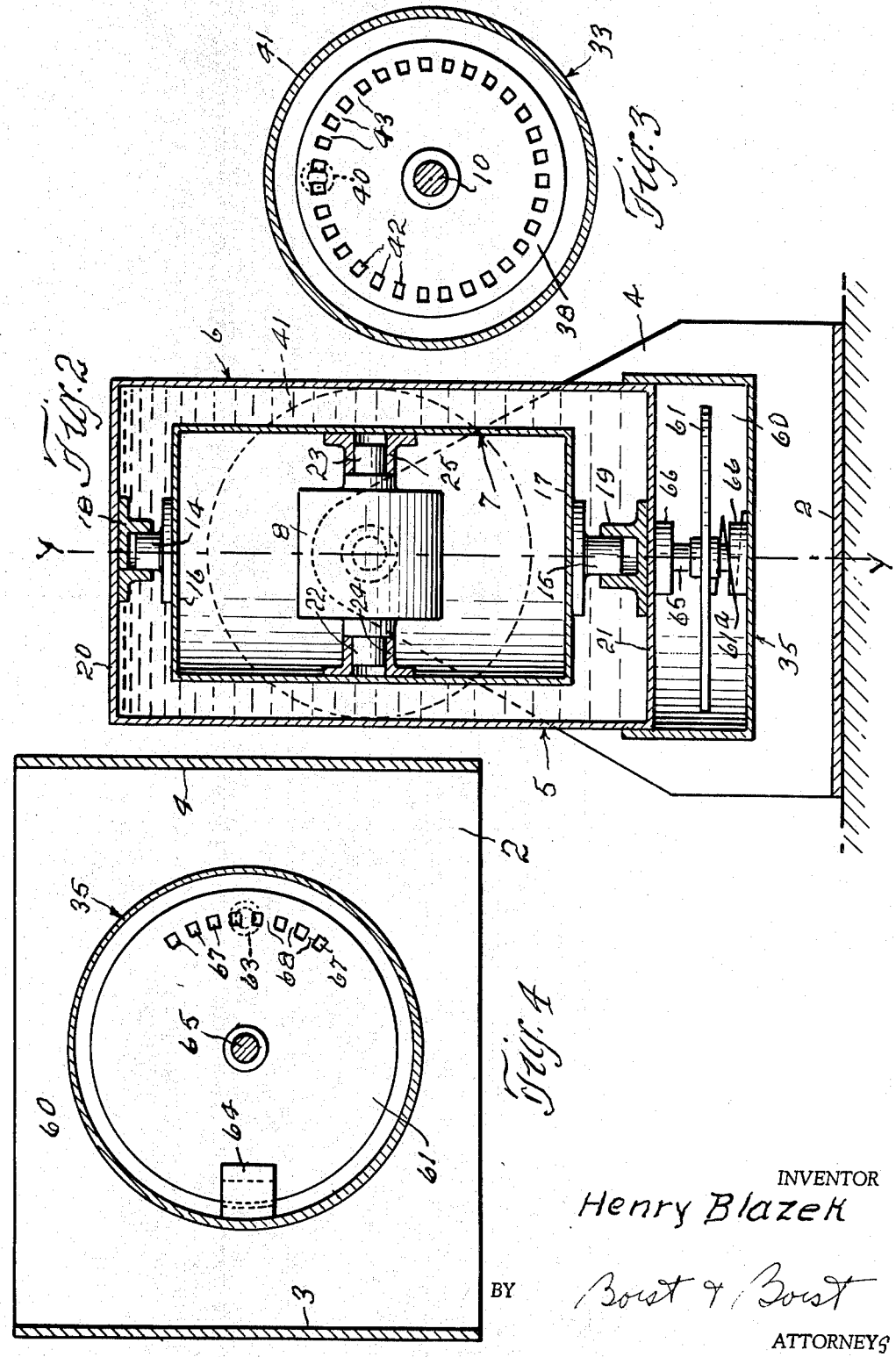

INVENTOR
Henry Blazek

United States Patent Office 3,224,281
Patented Dec. 21, 1965

3,224,281
BASE MOTION COMPENSATOR FOR
RATE INTEGRAL GYRO
Henry Blazek, Nyack, N.Y., assignor to Sperry Rand
Corporation, Ford Instrument Co. Division, Long
Island City, N.Y., a corporation of Delaware
Filed July 12, 1961, Ser. No. 123,493
16 Claims. (Cl. 74—5.6)

This invention relates specifically to conventional rate integral gyros which are adapted to be mounted upon moving vehicles, such as ships, airplanes and missiles to indicate changes in attitude, about an axis parallel to the rate integral gyro input axis, such for instance as a change resulting from a pitching of the vehicle. Three such rate integral gyros mounted on a vehicle with their input axes orthogonal are sufficient to indicate attitude in three dimensions.

Rate integral gyros of this type, when used for indicating changes in attitude, are provided with incremental transducers which are operative to indicate the angular change of the base of the gyro, with respect to the gyro case, about the input axis thereof. However, it is known that the output of the incremental transducer, used for this purpose, always contains an error which is proportionate to the rate, or angular velocity, of the gyro base, with respect to the gyro case, about the output axis of the gyro.

It is therefore the principal object of this invention to provide means which will automatically provide correction for this error and which when combined with the output of the incremental transducer of the rate integral gyro will indicate the correct angle of angular change of the gyro base, with respect to the gyro case, about the input axis thereof. To this end I provide a compensating incremental transducer which is operative to indicate the rate or velocity of the change of this angle about the output axis of the rate integral gyro, and which includes a rotatably mounted disk, the rotative axis of which is disposed in axial alignment with the output axis of the rate integral gyro. The output of the compensating incremental transducer will, when combined with the output of the gyro incremental transducer, indicate the correct angular change of the gyro base, with respect to the gyro case, about the input axis thereof.

Another object of the invention is to provide corrective means of the aforesaid character which is of simple construction and which is highly efficient in operation.

Having stated the principal objects of the invention, other and more specific objects thereof will be apparent from the following specification and the accompanying drawings forming a part thereof.

In the drawings showing the presently preferred embodiment of the invention:

FIG. 2 is a central transverse vertical section taken in a plane perpendicular to the plane of FIG. 1;

FIG. 3 is a vertical section taken substantially on the line 3—3 on FIG. 1;

FIG. 4 is a horizontal section taken on the line 4—4 on FIG. 1; and

Figure 1:
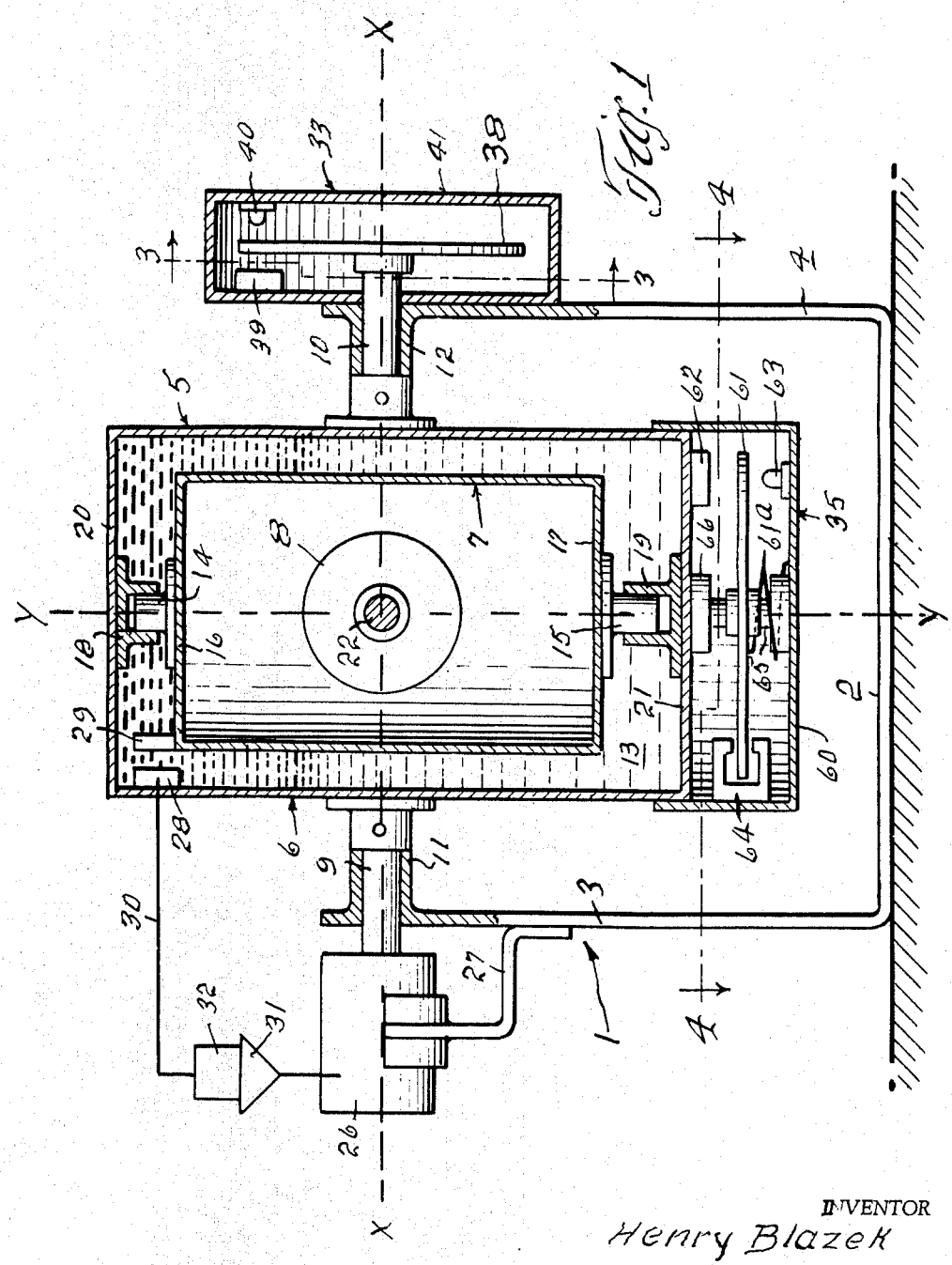
FIG. 1 is a central, longitudinal, vertical section schematically illustrating a rate integral gyro having the base motion compensating mechanism of the present invention applied thereto.

Referring now to the drawings by reference characters, the numeral 1 indicates generally the supporting frame for the rate integral gyro mechanism which frame comprises a base 2 by which the gyro mechanism is secured in fixed position to a vehicle, and a pair of spaced parallel upwardly extending supporting arms 3 and 4 by and between which the gyro mechanism, generally indicated by the numeral 5, is rotatably supported.

The gyro mechanism 5 comprises a gyro case 6, a gyro cylinder 7 and a gyro wheel or rotor 8. The gyro case 6 is provided with a pair of opposed axially aligned oppositely extending horizontally disposed trunnions 9 and 10 which are rotatably mounted in bearings 11 and 12 carried by the upwardly extending supporting arms 3 and 4 respectively.

The gyro cylinder 7 of the gyro mechanism 5, is rotatably supported and mounted centrally within the gyro casing 6 by a liquid bearing 13 and a pair of opposed axially aligned oppositely extending vertically disposed trunnions 14 and 15 which are secured to the upper and lower ends 16 and 17 respectively of the gyro cylinder 7 and are rotatably mounted in bearings 18 and 19 carried by the upper and lower ends 20 and 21 respectively of the gyro casing 6.

The gyro wheel or motor 8 is rotatably mounted and supported within the gyro cylinder 7 by a pair of opposed oppositely extending horizontally disposed axially aligned trunnions 22 and 23 which are rotatably mounted in bearings 24 and 25 respectively carried by the gyro cylinder 7. The gyro wheel or rotor 8 is adapted to be rotated by any conventional means, not shown.

A servo motor 26, which is carried by a bracket 27 secured to the supporting arm 3, is operatively connected to the trunnion 9 of the gyro case 6. The gyro case 6 and the gyro cylinder 7 are provided with a standard conventional electromagnetic pickup means which comprises an element 28 secured to and carried by the gyro case 6, and a cooperating element 29 secured to and carried by the gyro cylinder 7. The element 28 of the electromagnetic means is connected to the servo motor 26 by a conductor 30 in which a servo amplifier 31 and a suitable stabilizing network 32 are interposed. The servo motor 26 is rendered operative by the electromagnetic pickup means, through the conductor 30, servo amplifier 31 and stabilizing network 32, to null any relative displacement between the gyro case 6 and the gyro cylinder 7.

An incremental transducer 33, which includes a logic circuitry generally indicated by the numeral 34, is operatively connected to the gyro case trunnion 10; and a similar cooperating compensating incremental transducer 35, which includes a logic circuitry 36 similar to the logic circuitry 34, is operatively secured to the lower end wall 21 of the gyro case 6.

The incremental transducer 33 and logic circuitry 34 thereof are operative to indicate the amount and direction of the angular change of the base 2, with respect to the gyro case 6, about the input axis X—X of the gyro. However, it is known that there is always an error in the output of the logic circuitry 34 of the transducer 33 which is proportional to velocity of the angular change about the output axis Y—Y of the gyro.

The compensating incremental transducer 35 and the logic circuitry 36 thereof are operative to indicate the angular velocity, with respect to inertial space, of the angular change of the base 2 about the output axis Y—Y, and the direction thereof. The pulse output of the logic circuitry 36 of the transducer 35 is added to the pulse output of the logic circuitry 34 of the transducer 33 in a conventional pulse summing device 37, the pulse output of which indicates the correct angular change, in amount and direction, of the base 2, with respect to the gyro case 6, about the gyro input axis X—X.

The incremental transducer 33 comprises an opaque disk 38, an optical pickup 39, and a light source 40. The disk 38 is secured to the outer end of the gyro case trunnion 10 within a casing 41 secured in fixed position to the arm 4. The optical pickup 39 is secured in fixed position within the casing 41 on one side of the disk 38, and the light source 40 is secured in fixed position within the casing 41 on the opposite side of the disk 38 in alignment with the optical pickup 39.

The disk 38 is provided with an annular row of equally spaced similar windows 42, with the width of the opaque spaces 43 between adjacent windows being the same as the width of the windows. The light source 40 is mounted in position to project light through successive windows 42 during rotation of the disk 38.

The optical pickup 39 comprising a pair of photo-electric cells A and B, and a second pair of photoelectric cells C and D, which are mounted in an annular row in position to intercept light rays projected through the windows 42 by the light source 40. The distance between the cells of each pair of cells is exactly the same as the width of the windows 42; and the pair of cells C and D are offset with respect to the pair of cells A and B so that the cell C of the pair of cells C and D is disposed midway between the cells A and B of the other pair of cells.

Figure 5:
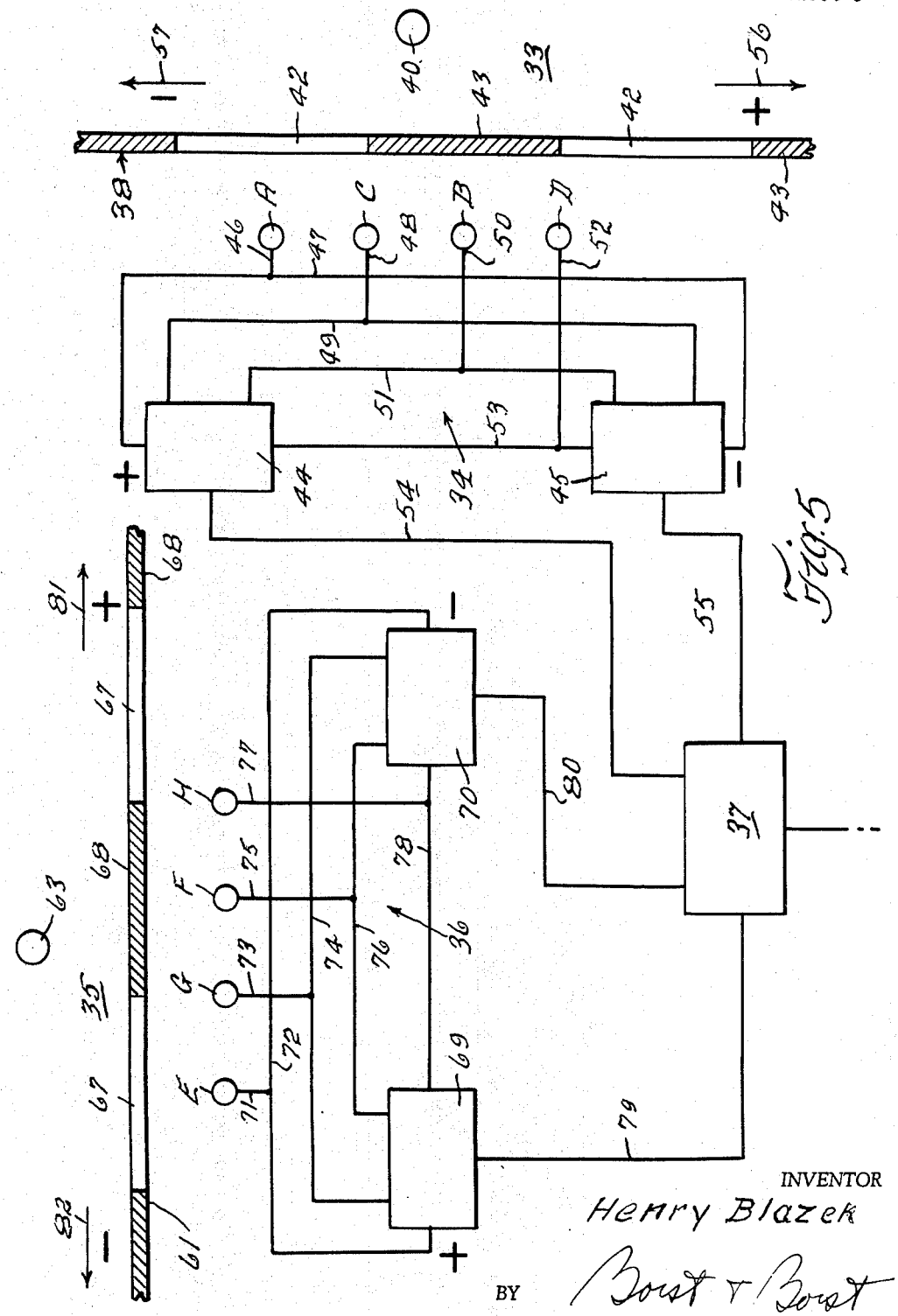
FIG. 5 is a diagrammatic view illustrating the incremental transducer and the logic circuitry thereof for the rate integral gyro, the incremental transducer and the logic circuitry thereof for the base motion compensator, and the cooperative relationship of the transducer of the gyro and the transducer of the base motion compensator.

The logic circuitry 34 of the incremental transducer 33 includes a pair of similar receivers, one of which 44 is termed the positive receiver, and the other of which 45 is termed the negative receiver. Each of the receivers 44 and 45, which are of conventional construction, comprises a pulse shaper and a logic circuitry which includes a plurality of "and" gates, one for each photoelectric cell of the optical pickup 39, and an "or" gate. All of the photoelectric cells of the optical pickup 39 are electrically connected to both of the receivers 44 and 45. The cell A is connected by the conductors 46 and 47; the cell C is connected by the conductors 48 and 49; the cell B is connected by the conductors 50 and 51, and the cell D is connected by the conductors 52 and 53. Output pulses from the positive receiver 44 are imparted to the summing device 37 through a conductor 54, and the output pulses from the negative receiver 45 are imparted to the summing device 37 through a conductor 55. The positive receiver 44 is operative to sense the amount and direction of the rotation of the disk 38 when it is rotated in a clockwise or positive direction as indicated by the arrow 56 in FIG. 5 and to accordingly impart pulses to the summing device 47 through the conductor 54; and the negative receiver 45 is operative to sense the amount and direction of the rotation of the disk 38 when it is rotated in a counterclcokwise or negative direction as indicated by the arrow 57 in FIG. 5 and to accordingly impart pulses to the summing device 37 through the conductor 55. When the disk 38 is rotated in a positive direction the photoelectric cells of the optical pickup 39 are successively subjected to light from the light source 40 in the following order, A, C, B and D, which triggers the positive receiver 44 to effect the imparting of pulses therefrom through the conductor 54 to the summing device 37; and when the disk 38 is rotated in a negative direction the photoelectric cells of the optical pickup 39 are successively subjected to light from the light source 40 in the following order, D, B, C and A, which triggers the negative receiver 45 and effects the imparting of pulses therefrom through the conductor 55 to the summing device 37.

The compensating incremental transducer 35, which is mounted in a casing 60 secured to the bottom wall 21 of the gyro case 6, comprises an opaque disk 61, an optical pickup 62, a light source 63, and a permanent magnet 64. The disk 61 is secured to a shaft 65 which is rotatably mounted in antifriction bearing 66 secured in fixed position within the casing 60. A soft coiled spring 61ª which is disposed about the disk 61 with one end thereof anchored to the disk 61 and the other end thereof anchored to the casing 60, is provided to loosely constrain the disk 61 to a null position. The torsional gradient of the spring is such that it has negligible effect on the dynamic performance of the compensating transducer 35. The spring 61ª is operative to limit errors resulting from parasitic torques on the disk 61, which if the disk 61 was completely unconstrained would in time cause the disk 61 to move out of its null position. The optical pickup 62 is secured in fixed position within the casing 60 on one side of the disk 61, and the light source 63 is mounted in fixed position within the casing 60 on the opposite side of the disk 61 in alignment with the optical pickup 62.

The disk 61 which is similar to the disk 38, is provided, through a sector of approximately 30°, with an annular row of equally spaced similar windows 67, with the opaque spaces 68 between adjacent windows being the same as the width of the windows 67. The light source 63 is mounted in position to project light through successive windows 67 during rotation of the disk 61.

The optical pickup 62, which is similar to the optical pickup 39, comprises two pairs of photoelectric cells which are mounted in an annular row in position to intercept light rays projected through the windows 67 by the light source 63. One pair of cells consists of the cells E and F, and the other pair of cells consists of the cells G and H. The distance between the cells of each pair of cells is exactly the same as the width of the windows 67; and one pair of cells G and H is offset with respect to the other pair of cells E and F so that the cell G of the one pair of cells G and H is disposed midway between the cells E and F of the other pair of cells.

The permanent magnet 64, the function of which will be explained hereinafter, is mounted in fixed position within the casing 60 in operative relation to the disk 61.

The logic circuitry 36 of the compensating incremental transducer 35 includes a pair of similar receivers, one of which 69 is termed the positive receiver and the other of which 70 is termed the negative receiver. Each of the receivers 69 and 70, which are similar to the receivers 44 and 45, comprises a pulse shaper and a logic circuitry which includes a plurality of "and" gates, one for each photoelectric cell of the optical pickup 62, and an "or" gate. All of the photoelectric cells of the pickup 62 are electrically connected to both of the receivers 69 and 70. The cell E is connected by the conductors 71 and 72; the cell G by the conductors 73 and 74; the cell F by the conductors 75 and 76; and the cell H by the conductors 77 and 78. Output pulses from the positive receiver 69 are imparted to the summing device 37 through a conductor 79, and output pulses from the negative receiver are imparted to the summing device 37 through a conductor 80. The positive receiver 69 is operative to sense the velocity and the direction of rotation of the disk 61 when it is rotated in a clockwise or positive direction as indicated by the arrow 81 in FIG. 5 and to accordingly impart pulses to the summing device 37 through the conductor 79; and the negative receiver 70 is operative to sense the velocity and direction of rotation of the disk 61 when it is rotated in a counterclockwise or negative direction as indicated by the arrow 82 in FIG. 5, and to accordingly impart pulses to the summing device 37 through the conductor 80. When the disk 61 is rotated in a positive direction the photoelectric cells of the pickup 62 are successively subjected to light from the light source 63 in the following order, E, G, F and H, which triggers the positive receiver 69 to effect the imparting of pulses therefrom to the summing device 37; and when the disk 61 is rotated in the negative direction the photoelectric cells of the pickup 62 are subjected to light from the light source 63 in the following order, H, F, G and E, which triggers the negative receiver 70 to effect the imparting of pulses therefrom to the summing device 37.

The summing device 37, which is of conventional construction, combines the "angular change" pulses from either of the receivers 44 or 45 with the "velocity of change" pulses from either of the receivers 69 or 70 to effect a true indication of the angular change of the gyro, and consequently of the vehicle on which the gyro is mounted in fixed position, about the input axis X—X of the gyro.

The operation of the compensating incremental transducer in connection with the gyro incremental transducer will now be described, it being assumed that the vehicle to which the base 2 of the gyro is secured in fixed position has a constant attitude in inertial space. If the base 2 of the gyro mechanism 5 experiences an angular acceleration about the output axis Y—Y thereof, a relative angular velocity will exist between the compensation transducer casing 60 and the rotatably mounted disk 61 therein since the inertia of the disk 61 will tend to maintain its angular velocity constant. The relative velocity of rotation between the casing 60 and the disk 61 will cause the permanent magnet 64 to generate eddy currents in the disk 61 which will react with the field of the magnet 64 and generate torques which will tend to cause the disk 61 to rotate at the same velocity as the casing 60. If the base 2 reaches a constant velocity then in the steady state the disk 61 will rotate at the same velocity as the casing 60, but will lag behind the casing 60 by an angle which is proportional to the angular velocity of the base 2 about the gyro output axis Y—Y. This angle will be sensed by the compensating incremental transducer 35 and when its output pulses are combined with the output pulses of the rate integral gyro transducer 33 the result is a true indication of the angular change of the gyro base 2 about the gyro input axis X—X. Since no angular motion was assumed about the gyro input axis the true indication is zero. Therefore the output of the rate integral gyro transducer 33 was all error and the output of the compensating incremental transducer 35 was just sufficient to cancel the error. In terms of pulses, the pulses provided by the compensating incremental transducer 35 were equal in number, and of opposite polarity, to the error pulses from the rate integral gyro transducer 33.

The same structure as described above could be used as an accelerometer if weights were added to one side of the gyro cylinder 7 whereby the weights would shift the center of gravity of the device, along the spin axis, away from the center of support, thereby, creating a pendulous type accelerometer.

Accelerometers of this type use the same incremental transducers that rate integral gyros use and are subject to the same errors. Therefore, providing an accelerometer of the character described with a compensating incremental transducer as described hereabove would provide means for automatically correcting errors in the incremental transducer of the accelerometer.

From the foregoing it will be apparent to those skilled in this art that I have provided a very simple and efficient mechanism for accomplishing the objects of the invention.

It is to be understood that I am not limited to the specific construction shown and described herein, as various modifications may be made therein within the spirit of the invention and the scope of the appended claims.

What is claimed is:

1. A sensing and indicating mechanism for sensing and indicating correct changes in attitude of a rate integral gyro which comprises a base, a gyro case, and shaft means by which said case is rotatably mounted on said base for rotation about the input axis of said gyro; said mechanism comprising a gyro incremental transducer which includes a logic circuitry and is operative to sense the angular change of said base with respect to said case about the input axis of said gyro and to impart output pulses in accordance therewith, a compensating incremental transducer which includes a logic circuitry and is operative to sense the angular velocity of said base with respect to inertial space about the output axis and to impart output pulses in accordance therewith, and a summing device which is operative to receive and combine the output pulse of said transducers and to impart output pulses in accordance therewith which indicate the change in attitude of said gyro.

2. A sensing and indicating mechanism for sensing and indicating correct changes in attitude of a rate integral gyro which comprises a base, a gyro case, and shaft means by which said case is rotatably mounted on said base for rotation about the input axis of said gyro; said mechanism comprising a gyro incremental transducer which includes a logic circuitry and is operative to sense the angular change of said base with respect to said case about the input axis of said gyro and to impart output pulses in accordance therewith, which output pulses include an error which is proportional to the angular velocity of said base about the output axis of the gyro, a compensating incremental transducer which includes a logic circuitry and is operative to sense the angular velocity of said base with respect to inertial space about the output axis and to impart output pulses in accordance therewith, and a summing device which is operative to receive and combine the output pulses of said transducers and to impart output pulses in accordance therewith which indicate the correct change in the attitude of said base with respect to the gyro case about the gyro input axis.

3. A sensing and indicating mechanism as defined by claim 1 in which said compensating incremental transducer includes a disk which is rotatably mounted on said gyro case with the axis thereof disposed in alignment with the output axis of said gyro.

4. A sensing and indicating mechanism as defined by claim 3 in which said compensating incremental transducer also includes an optical pickup which is connected to the logic circuitry of said compensating incremental transducer and is operatively associated with the said disk of said compensating incremental transducer.

5. A sensing and indicating mechanism as defined by claim 4 in which the disk of said compensating incremental transducer is provided with an annular row of similar equally spaced windows and in which a light source is provided which is operative to project light rays through successive windows onto said optical pickup as said disk is rotated.

6. A sensing and indicating mechanism as defined by claim 5 in which said optical pickup comprises a plurality of photoelectric cells which are disposed in an annular row and are adapted to be successively subjected to light rays from said light source which are projected through said windows as said disk is rotated.

7. A sensing and indicating mechanism as defined by claim 6 in which said compensating incremental transducer also includes a permanent magnet which is associated with the said disk and is operative to generate eddy currents in the said disk which react with the field of said permanent magnet and generate torques which tend to cause the said disk to rotate at the same velocity as the said case of the said rate integral gyro.

8. A sensing and indicating mechanism as defined by claim 1 in which said gyro incremental transducer includes a disk which is secured to said shaft means for rotation therewith.

9. A sensing and indicating mechanism as defined by claim 8 in which said gyro incremental transducer also includes an optical pickup which is connected to the logic circuitry of said gyro incremental transducer and is operatively associated with the said disk of said gyro incremental transducer.

10. A sensing and indicating mechanism as defined by claim 9 in which the disk of said gyro incremental transducer is provided with an annular row of similar equally spaced windows and in which a light source is provided which is operative to project light rays through successive windows onto said optical pickup as said disk is rotated.

11. A sensing and indicating mechanism as defined by claim 10 in which said optical pickup comprises a plurality of photoelectric cells which are disposed in an annular row and are adapted to be successively subjected to light rays from said light source which are projected through said windows as said disk is rotated.

12. A sensing and indicating mechanism as defined by claim 1 in which said gyro incremental transducer includes a disk which is secured to said shaft means for rotation therewith; and in which said compensating incremental transducer includes a disk which is rotatably mounted on said gyro case with the axis thereof disposed in alignment with the output axis of said gyro.

13. A sensing and indicating mechanism as defined by claim 12 in which said gyro incremental transducer also includes an optical pickup which is connected to the said logic circuitry of said gyro incremental transducer and is operatively associated with the said disk of said gyro incremental transducer; and in which said compensating incremental transducer also includes an optical pickup which is connected to the said logic circuitry of said compensating incremental transducer and is operatively associated with the said disk of said compensating incremental transducer.

14. A sensing and indicating mechanism as defined by claim 13 in which the said disk of said gyro incremental transducer is provided with an annular row of equally spaced windows and in which a light source is provided in said gyro incremental transducer which is operative to project light rays through successive windows onto said optical pickup as said disk is rotated; and in which the said disk of said compensating incremental transducer is provided with an annular row of equally spaced windows and in which a light source is provided in said compensating incremental transducer which is operative to project light rays through the successive windows of the said disk of said compensating incremental transducer on to the said optical pickup of said compensating incremental transducer as the said disk is rotated.

15. A sensing and indicating mechanism as defined by claim 14 in which the said optical pickup of said gyro incremental transducer comprises a plurality of photoelectric cells which are disposed in an annular row and are adapted to be successively subjected to light rays from the said light source of said gyro incremental transducer which are projected through the said windows of the said disk of said gyro incremental transducer as the said disk of said gyro incremental transducer is rotated; and in which the said optical pickup of said compensating incremental transducer comprises a plurality of photoelectric cells which are arranged in an annular row and are adapted to be subjected to light rays from the said light source of said compensating incremental transducer which are projected through the said successive windows of the said disk of said compensating incremental transducer as the said disk of said compensating incremental transducer is rotated.

16. A sensing and indicating mechanism as defined by claim 15 in which said compensating incremental transducer also includes a permanent magnet which is associated with the said disk of said compensating incremental transducer and is operative to generate eddy currents in the said disk of said compensating incremental transducer which react with the field of said permanent magnet and generate torques which tend to cause the said disk of said compensating incremental transducer to rotate at the same velocity as the said case of the said rate integral gyro.

References Cited by the Examiner
UNITED STATES PATENTS

| | | | |
|---|---|---|---|
| 1,880,994 | 10/1932 | Sperry | 74—5.4 X |
| 2,817,974 | 12/1957 | Muzzey et al. | 74—5.4 |
| 2,954,700 | 10/1960 | Deschamps | 74—5.6 X |

BROUGHTON G. DURHAM, *Primary Examiner.*

TEN EYCK W. SHEAR, *Assistant Examiner.*